Aug. 10, 1965 S. H. AUTLER 3,200,299

SUPERCONDUCTING ELECTROMAGNET

Filed Oct. 4, 1960 2 Sheets-Sheet 1

INVENTOR.
STANLEY H. AUTLER
BY Edward D. Thomas
AGENT

Aug. 10, 1965 S. H. AUTLER 3,200,299

SUPERCONDUCTING ELECTROMAGNET

Filed Oct. 4, 1960 2 Sheets-Sheet 2

INVENTOR.
STANLEY H. AUTLER

BY

Edward D. Thomas
AGENT

United States Patent Office 3,200,299

Patented Aug. 10, 1965

3,200,299

SUPERCONDUCTING ELECTROMAGNET

Stanley H. Autler, Cambridge, Mass., assignor to Massachusetts Institute of Technology, Cambridge, Mass., a corporation of Massachusetts Filed Oct. 4, 1960, Ser. No. 60,392
3 Claims. (Cl. 317—123)

This invention relates generally to electromagnets energized with superconducting coils and more particularly to an electromagnet energized by a persistent current flowing in a completely superconducting circuit to establish and maintain a very stable magnetic field.

Scientific research on the properties of solids frequently require the joint use of very low temperatures and stable uniform magnetic fields. For example, paramagnetic, ferromagnetic and cyclotron resonance, adiabatic demagnetization, and certain optical and infrared absorption measurements are often done at liquid helium temperature. In addition, certain devices such as solid state masers require this combination.

Frequently part of the apparatus is closed in a cacuum flask containing liquid helium, which in turn is placed inside another flask containing liquid nitrogen. The entire set of vacuum flasks is then placed between the pole faces of an electromagnet. An arrangement of this type requires a large, massive structure which consumes considerable power in order to provide an intense field across the large gap required for the flask assembly. Such magnets are costly and require considerable space. Large electromagnets of this type require power supplies which inherently have ripple which is difficult and costly to minimize and hence the magnetic fields so produced generally are not free from minor deviations.

An alternate approach takes advantage of the superconducting properties of certain conductors at very low temperatures. A superconducting coil, such as a simple solenoid, can be wound small enough to fit directly inside a dewar flask containing liquid helium. Such magnets have the advantage of compactness and practically negligible power requirements. The superconducting coil has zero electrical resistance so that no power is required to maintain current flow and there is no heat loss in the coil to boil off liquid helium. Only a minute amount of power is required to provide the heat loss in the leads to the coil and in any external current control resistance. However, it is also a well known property of superconductors that the presence of a magnetic field can quench the superconductivity. Hence, for a given coil, depending upon various geometrical factors, wire size, number of turns, superconductive material and temperature, there is a critical current which produces a cridical field at which superconductivity is quenched. The coil then is restored to a state of normal conductivity and heat dissipation in the coil causes boiling of the liquid helium in which the coil is immersed.

Persistent currents can be set up in a superconducting coil allowing the power supply to be disconnected, and a completely stable magnetic field can be maintained as long as the coil is kept cold. From Faraday's equation for electromagnetic induction and London's well-known modification of Maxwell's equations to derive the electromagnetic equation of a superconductor, it appears that any alteration in the magnetic field would excite persistent currents so as to maintain the magnetic field constant.

Since the superconductive coils are small and have relatively little inductance, they are well adapted for applications requiring alternating or rapidly varying fields.

The primary object of the invention is to provide relatively high stable magnetic fields of controlled strength at low temperatures with low power inputs.

Another object of the invention is to provide relatively high variable magnetic fields at low temperatures by electromagnets having low power input and low heat losses.

Certain limitations of the simple superconductive coil can be overcome by the use of the ferromagnetic cores. The magnetic field within a gap in the core can reach relatively high strengths, limited by the dimensions of the gap and the magnetic saturation characteristics of the core. The magnetic field at the coil can then be limited to a value below the critical field at which the superconductivity of the coil winding is quenched.

In setting up persistent currents, it is contemplated that the use of a switch which physically breaks the circuit is undesirable because oxides and other surface contamination may prevent reliable superconductive contacts. Instead, a superconductive switch is employed in which the shift from normal conductivity to superconductivity performs the function of switching.

These and other objects and advantages of this invention will become more apparent from the following description and accompanying drawings in which.

A solenoid consisting of many turns of insulated superconducting wire wound on a hollow cylindrical form can provide a uniform magnetic field over a large volume. The maximum field of such a coil is limited by the fact that the inner turns of the wire are exposed to the field inside the coil. When this field exceeds the critical field $H_c$, which is a function of the superconducting material, the temperature, and the current in the wire, superconductivity is quenched. If the current through the coil is raised to the point where $H_c$ is exceeded, the resistance of the coil becomes finite, the current drops and heat is generated.

Figures 1, 6:
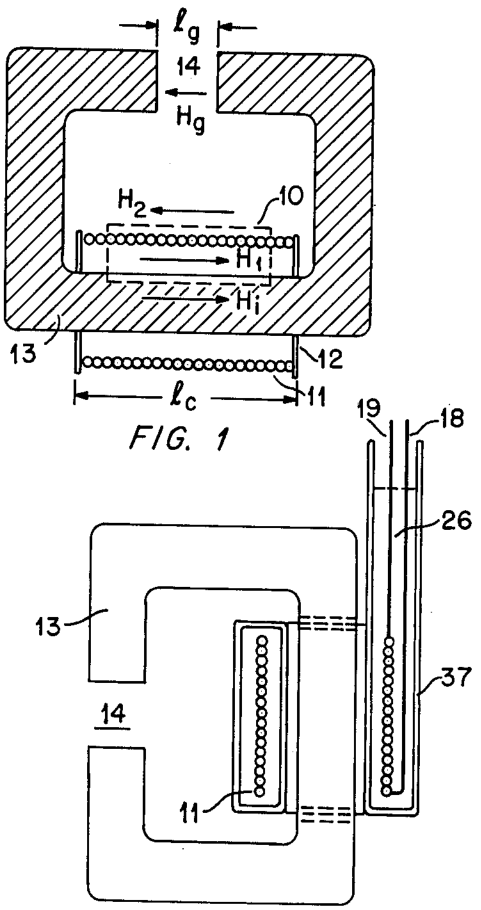
FIGURE 1 is an idealized magnetic circuit for calculating the approximately upper limit to the fiield strength attainable in an air gap.
FIGURE 6 is a cross sectional view of an alternate core arrangement.

Magnetic fields much higher than $H_c$ can be produced by using superconducting coils such as coil 11 in FIGURE 1, to energize a ferromagnetic core 13 containing a gap 14. Although superconductivity is quenched if the field strength equals $H_c$ at some part of the coil, the field in the gap 14 may then be much higher than $H_c$.

Assuming that core 13 has infinite permeability, H in the core must vanish and the entire magnetomotive force appears across the gap 14. Hence:

$$H_i=0$$

$$H_g=\frac{0.4\pi NI}{l_g} \quad (1)$$

$H_i$=field strength in the core 13
$H_g$=field strength in gap 14
$N$=total number of turns in coil 11
$I$=current in coil 11 in amperes.

As the tangential component of H is continuous, $$H_1 \approx H_i = 0$$

where $H_1$ is the tangential field at the inner surface of coil 11.

Taking a line integral about the dotted path 10 in FIGURE 1, $$H_2 \approx \frac{0.4\pi NI}{l_c} \qquad (2)$$

where $H_2$ is the tangential field at the outer surface of coil 11. In obtaining Equation 2 the contribution of the part of the integral inside the current-carrying region has been neglected. This contribution approaches zero in a thin sheet. $H_2$ will not in general be small and quenching occurs at the outer surface of the coil for sufficiently large I. This is to be contrasted with air core coils where the largest fields occur inside the coil.

Dividing Equation 2 by Equation 1 and setting $H_2=H_c$, the approximate upper limit to the field strength $H_g$ attainable in the gap 14 is found by:

$$H_g\ (\text{max.}) \approx H_c \frac{l_c}{l_g} \qquad (3)$$

where $H_g$ (max.) = maximum gap field strength
$l_c$ = length of coil
$l_g$ = length of gap Equation 3 shows that with the ratio of $l_c$ to $l_g$ much greater than 1, $(l_c/l_g >> 1)$, it should be possible to make $H_g >> H_c$. This restriction, that $l_c$ be greater than $l_g$, is not found for ordinary electromagnets at ordinary temperatures.

The field obtainable in an actual magnet may fall short of Equation 3 for several reasons. For example, superconductivity may be quenched at a lower current than would be predicted by setting $H_2=H_c$ in Equation 2. This occurs if the coil is placed too near the gap and is exposed to fringing fields. With the configuration illustrated in FIGURE 1, however, quenching occurs at about the same current on or off the core.

Further Equation 3 will not be even approximately valid if any part of the core 13 is saturated. $H_g$ clearly cannot exceed the saturated flux density of the core. Actually locating the coil 11 as far from the gap 14 as in FIGURE 1 results in an inefficient magnetic circuit if the gap length $l_g$ is appreciable, for only a small fraction of the flux through the coil 11 will pass through gap 14 and the core inside coil 11 will saturate while $H_g$ is still relatively small.

Figure 2:
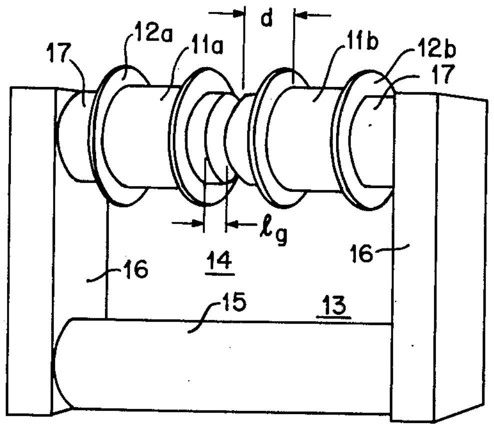
FIGURE 2 is a perspective view of one embodiment of the invention.

FIGURE 2 illustrates a magnet structure which demonstrates the importance of optimum coil positioning. Ferromagnetic core 13 is made up of amature 15, parallel legs 16 and pole pieces 17. By way of example, the armature 15 and pole pieces 17 may have a one inch diameter, the armature length may be 4 inches, and the air gap 14 is made ¼ inch. The parallel legs 16 are then ½ inch thick, 1 inch wide and 3½ inches long. Coils **11*a* and 11*b* are each wound with 2000 turns of silk covered 5 mil niobium wire. Care must be taken in winding niobium wire to avoid kinks in the wire to insure continuity of winding and to avoid damage to the insulation which could cause the occurrence of short circuited turns. Coils 11*a* and 11*b* are wound on bobbins 12*a* and 12*b*, respectively, which have an inner diameter making a snug but movable fit on pole pieces 17**. The dimensions given above are not critical but are limited by the neck opening of the vacuum flask available to hold the liquid helium.

Figure 3:
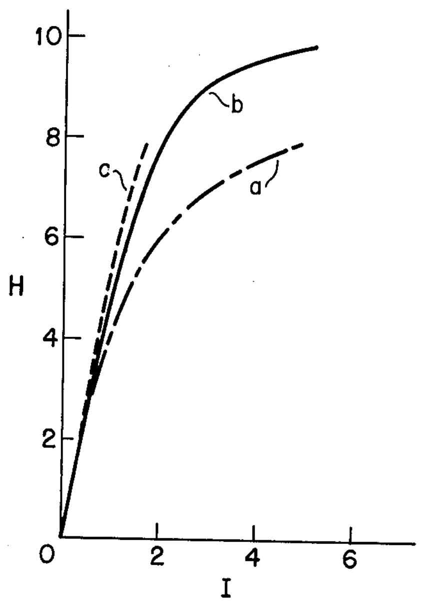
FIGURE 3 is a plot of the magnetic characteristics of the device of FIGURE 2.

The measured gap fields $H_g$ for several different coil positions are plotted in FIGURE 3. With coils **11*a* and 11*b*** close to the gap (distance *d* of FIGURE 2, 3⁄64 inch) curve *c* shows that there is little wasted flux, but fringing results in quenching of the coils at a coil current of 1.6 amperes. Moving the coils away from the gap (distance *d* of FIGURE 2, 57⁄64 inch), curve *a* shows that quenching occurs at a much higher coil current of 4.8 amperes, but the less efficient magnetic circuit results in earlier saturation of the core material. Curve *b*, taken with the coils midway between these positions ($d$=27⁄64 inch) gives values of $H_g$ reaching 9600 gauss before quenching occurs at a coil current exceeding 5 amperes.

Details concerning these measurements were published by me in The Review of Scientific Instruments, vol. 31, No. 4, April 1960, pp. 369–373.

Higher fields result from increasing the area of the pole pieces within the coils and then tapering them at the gap. A magnet, with a general form similar to that shown in FIGURE 2, with a larger core and pole pieces 1½ inches in diameter and tapering to 1.0 inch at the gap, generates up to 14000 gauss across a gap of ¼ inch. However, those skilled in the art of conventional magnet design will recognize how to improve the efficiency of the magnetic circuit, bearing in mind that the total length of series connected coils must be equal to or longer than $$l_g H_g(\text{max.})/H_c$$

which follows from Equation 3. The coils must avoid fringing effects at the gap, as illustrated in FIGURE 3.

I have observed that the use of niobium wire as drawn produces magnets generating higher fields than is the case when annealed niobium wire is used. Hence, it appears that $H_c$ is also a function of strain and that maximum fields can be realized by optimizing the degree of strain in the superconducting material.

Figure 4:
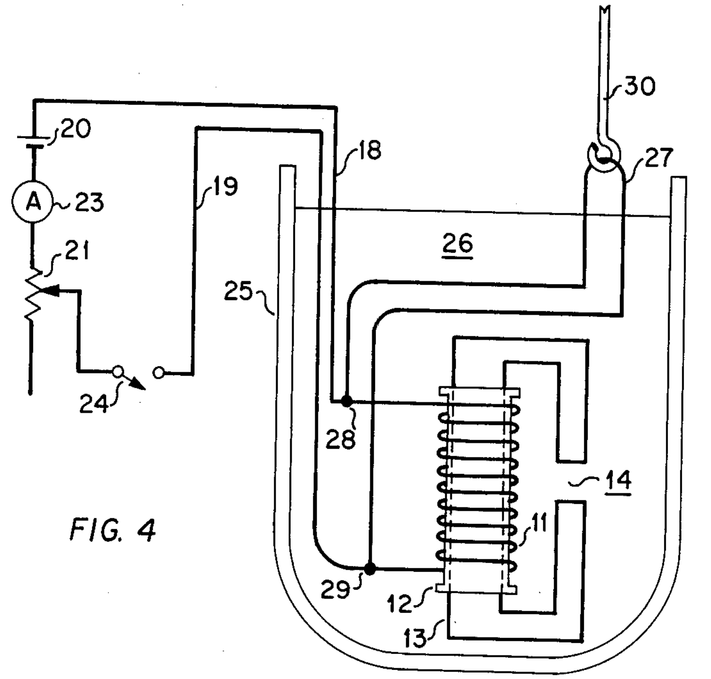
FIGURE 4 is a schematic diagram of the electrical circuit connections for setting up persistent currents.

FIGURE 4 shows the schematic circuit diagram for setting up a completely superconducting circuit for the current through the coil 11. For the sake of simplicity, the arrangement of coil and core of FIGURE 1 is shown. As before, coil 11 is shown wound on bobbin 12, preferably niobium wire is used. It is necessary to be careful in making contacts between the niobium wire and the copper leads 18 and 19 or quenching will occur at relatively small currents independent of the magnetic field strength within the solenoid. A good connection to 5 mil niobium wire, capable of carrying at least 6.5 amperes can be made by spot welding the niobium wire to a short length of 20 mil platinum wire and soft-soldering the copper lead to the other end of the platinum wire. Lead 18 is connected to one terminal of battery 20 while lead 19 is connected through switch 24 to one terminal of rheostat 21. A current indicating meter 23 is connected between the movable contact 22 of rheostat 21 and the remaining terminal of battery 20. The assembly of coil 11 on bobbin 12 is shown within vacuum flask 25 submerged in liquid helium bath 26. If desired vacuum flask 25 may in turn be enclosed in a second vacuum flask (not shown) containing liquid nitrogen to reduce the rate of loss of helium from flask 25.

A superconductive switch may take the form of a loop 27 of niobium wire, the ends of which are spot welded to leads 18 and 19 at points 28 and 29 respectively. The uppermost part of the loop is held above the helium surface by support 30 which extends beyond the neck of flask 25. That portion of loop 27 which is above the surface of the liquid helium bath 26 is at a temperature sufficiently above critical so that it possesses normal conductivity. Its small but finite resistance is in parallel with the zero resistance of superconductive coil 11, so that loop 27 carries no steady-state current. When the current through coil 11 from battery 20 has been adjusted by rheostat 21 to a desired value, the wire of loop 27 can be lowered by means of support 30 to a position below the surface of the liquid helium bath 26 where it becomes super-conductive. It follows from Faraday's law that the total flux linking a completely superconducting circuit cannot be changed. Therefore, when the power supply battery 20 is disconnected by opening switch 24, current continues to flow through the coil 11 but switches from the external circuit to the superconducting loop 27. In this way persistent currents can be established in the completely superconducting circuit for the current through coil 11 and stable magnetic fields can be maintained at a predetermined strength as long as the circuit remains in the superconductive state. Stable magnetic fields produced by the persistent current technique have been found useful for a solid state maser.

The superconductive switch of FIGURE 4 operates by means of the mechanical displacement of loop 27 from one temperature zone to another to shift the conductivity of loop 27 from the normal state to the superconductive state. FIGURE 4 illustrates a practical embodiment of the concept that the act of switching need not physically break the electrical continuity of a circuit but that a change of conductive state may perform the switching function. However, in certain arrangements of apparatus, the mechanical displacement technique may have disadvantages and wholly electrical operation may be preferred.

Figure 5:
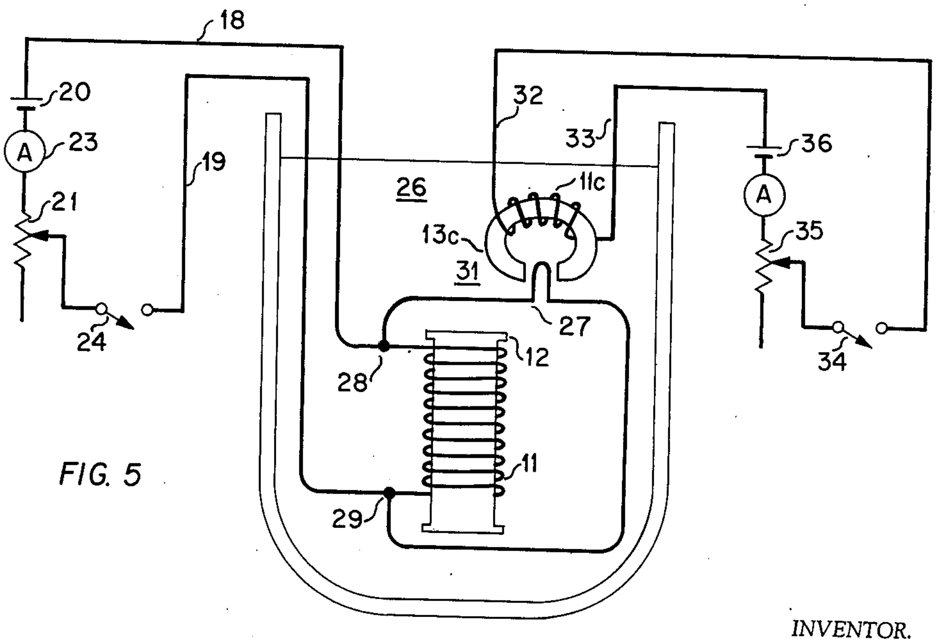
FIGURE 5 is a schematic diagram of a particular embodiment of the invention employed as a switching device.

For this purpose, the phenomenon noted above, the quenching of superconductivity by a magnetic field, can be used to produce the required change of state of conductivity in the superconductive switch. As shown in FIGURE 5, loop 27 of the switch is submerged in the liquid helium bath 26 at all times. A portion of loop 27 is placed within the gap field of electromagnet 31. Taking the form shown schematically as a coil $11_c$ wound about core $13_c$, electromagnet 31 is connected by leads 32 and 33 through a switch 34 and rheostat 35 to a battery 36.

When switch 34 is closed, the magnetic field within the gap, wherein loop 27 is located, is made sufficiently high by adjustment of rheostat 35 to quench superconductivity in loop 27 and establish a state of normal conductivity. As before, the small but finite resistance of loop 27 is in parallel with the zero resistance of superconductive coil 11 and hence loop 27 carries no steady-state current while the current through coil 11 from battery 20 is being adjusted by rheostat 21 to a predetermined desired value. Now opening switch 34 removes the magnetic field of electromagnet 31 from loop 27 and the material of loop 27 is placed in a state of superconductivity to make a completely superconductive circuit including coil 11. Battery 20 can now be disconnected by opening switch 24 and the persistent current continues to flow through coil 11 as described above for the circuit of FIGURE 4. Ferromagnetic cores are omitted in FIGURE 5 because the switch is useful with an air core solenoid, but this kind of switch is also useful with ferromagnetic core magnets. Constant magnetic fields at any desired value below the critical field for the superconductive material used in coil 11 are readily secured and maintained by this technique.

It will be apparent that small superconductive coils possess relatively little inductance and hence are more readily excited with variable currents than the massive prior art structures. Hence, an alternating current source may be substituted for battery 20 or a source of voltage or current pulses can be connected to energize coil 11 in order to obtain alternating or pulsed magnetic fields as desired. Varying magnetic fields of this type will produce some heating of a ferromagnetic core due to hysteresis loss and eddy currents, but such losses can be minimized by the small physical size of the electromagnet and by selection of the materials used for laminated cores.

It is apparent that many coil arrangements are possible. By way of example, two coils can be placed on a common form and one of the coils arranged for persistent current excitation to set a magnetic field at a desired level while the second coil is excited with a variable current to sweep the field within a desired range at a predetermined rate of change. Lest this statement seem contradictory to the presistent current theory of a constant magnetic field, a word of explanation is needed. While the behavior of the superconductor, discussed above with respect to the use of persistent currents, requires a persistent current to flow of such a magnitude that the magnetic field is maintained constant, it is the *total* flux linking the superconducting circuit that can not be changed. It is quite evident that the field produced by the current in the second coil can vary the field in a local region in a predetermined manner which alters the flux distribution without affecting the total flux linking the super-conducting circuit. It is even possible with a two coil arrangement to provide for a coarse adjustment of field strength with one coil and a fine adjustment within a limited region with the second coil, provision being made for setting up persistent currents independently in the two coils.

Only the coils of the iron core magnets need be cold. By inserting narrow thermally insulating gaps in the magnetic path, or between the coils and the core, it is possible to avoid cooling the greater part of the iron without losing too much working gap field strength. FIGURE 6 illustrates one possible arrangement wherein coil 11 is shown contained within an annular thermally insulated flask 37 so formed that core 13 can be assembled through the center opening with very little clearance. Flask 37 is shown to contain sufficient liquid helium 26 to keep coil 11 superconducting while leads 18 and 19 are run up through the neck of the flask to an external source of power (not shown). As shown by the dotted lines, the annulus of the flask could be omitted and a portion of the core 13 included within the flask. Insulating the working gap thermally from the liquid helium bath makes possible measurements on materials in the gap over a range of temperatures above that of liquid helium.

It is apparent that in superconducting electromagnets of the type having an iron core, it becomes possible to shape the pole pieces at the working gap in order to shape the field to obtain some predetermined field configuration.

It is likewise apparent that there are a number of materials which are known to possess higher values of the critical magnetic field than niobium and which would be valuable in securing higher magnetic fields by the foregoing devices if they can be fabricated in useful forms; and further many modifications of coil form and core dimension may be made without departing from the scope of the invention herein described. Hence, it is intended that all matter contained in the above description or shown in the accompnying drawings shall be interpreted as illustrative and not in a limiting sense.

What is claimed is:

1. A superconducting electromagnet comprising a coil wound with wire having superconducting properties at low temperature, a ferromagnetic core passing through said coil, said core having an air gap external to said coil, the length of said coil exceeding the length of said gap, means for maintaining said coil at a temperature level at which superconductivity is obtained, a source of direct current, means for energizing said coil from said source, and means to control the amplitude of current flow through said coil whereby the magnetic field of said coil is held below a critical strength at which superconductivity is quenched while the magnetic field strength across said air gap exceeds said critical value.

2. A superconducting electromagnet comprising a ferromagnetic core, a plurality of coils wound with wire having low temperature superconducting properties and mounted on said core, said core having an air gap external to said coils, the total length of said coils in series connection extending the length of said gap, means for maintaining said coils at a temperature level producing superconductivity, a source of direct current, means for connecting said coils in series with said source, and means to control the amplitude of current flow through said coils whereby the magnetic field of said coils is held at a predetermined value below the critical value at which superconductivity is quenched while the magnetic field strength across said air gap exceeds said critical value.

3. Apparatus for obtaining constant magnetic fields at controlled strengths comprising, a direct current source, a coil wound with wire having superconduction properties at low temperature, means for maintaining said coil at a temperature level at which superconductivity occurs, means for applying a predetermined amplitude of current to said coil from said source, means for completing a superconductive path including said coil, means for disconnecting said source from said coil, and a ferromagnetic core passing through said coil, said core having shaped pole pieces defining an air gap external to said coil whereby the constant magnetic field established by the persistent current flow in said superconductive path is held at a value across said coil below the critical strength at which superconduction is quenched for air gap magnetic field strengths of predetermined configuration exceeding said critical value.

References Cited by the Examiner

UNITED STATES PATENTS

| | | | |
|---|---|---|---|
| 2,913,881 | 11/59 | Garwin. | |
| 2,979,668 | 4/61 | Dunlap | 338—32 X |
| 3,098,181 | 7/63 | Cioffi | 317—158 |
| 3,116,422 | 12/63 | May et al. | 307—88.5 |

OTHER REFERENCES

Autler: Superconducting Electromagnets, "Review of Secientific Instruments," vol. 31, No. 4, April 1960, pp. 369–373.

"An Analysis of the Operation of a Persistent-Supercurrent Memory Cell," by R. L. Garwin, article in I.B.M. Journal, October 1957, pp. 304–308.

SAMUEL BERNSTEIN, *Primary Examiner.*

LLOYD McCOLLUM, *Examiner.*